US012691978B2

(12) United States Patent
Hong et al.

(10) Patent No.: US 12,691,978 B2
(45) Date of Patent: Jul. 28, 2026

(54) FLOATING OFFSHORE STRUCTURE AND FLOATING OFFSHORE POWER GENERATION APPARATUS HAVING SAME

(71) Applicant: HYUNDAI HEAVY INDUSTRIES CO., LTD., Ulsan (KR)

(72) Inventors: Jin Wuk Hong, Ulsan (KR); Jong Jin Jung, Ulsan (KR); Joong Soo Moon, Ulsan (KR); Moon Kyu Park, Ulsan (KR); Sang Min Suk, Ulsan (KR); Yong Man Park, Ulsan (KR); Seong Hoon Kim, Ulsan (KR); Dae Ung Lim, Ulsan (KR); Min Kyeong Lee, Ulsan (KR); In Hye Lee, Ulsan (KR); Min Han Oh, Ulsan (KR); Young Jae Sung, Ulsan (KR)

(73) Assignee: HYUNDAI HEAVY INDUSTRIES CO., LTD., Ulsan (KR)

( * ) Notice: Subject to any disclaimer, the term of this patent is extended or adjusted under 35 U.S.C. 154(b) by 396 days.

(21) Appl. No.: 18/250,583

(22) PCT Filed: Oct. 27, 2021

(86) PCT No.: PCT/KR2021/015242
§ 371 (c)(1),
(2) Date: Apr. 26, 2023

(87) PCT Pub. No.: WO2022/092818
PCT Pub. Date: May 5, 2022

(65) Prior Publication Data
US 2023/0406457 A1 Dec. 21, 2023

(30) Foreign Application Priority Data

Oct. 30, 2020 (KR) ........................ 10-2020-0143771
Jul. 20, 2021 (KR) ........................ 10-2021-0095134
(Continued)

(51) Int. Cl.
*B63B 35/44* (2006.01)
*B63B 1/10* (2006.01)
*F03D 13/25* (2016.01)

(52) U.S. Cl.
CPC .............. *B63B 35/44* (2013.01); *B63B 1/107* (2013.01); *F03D 13/256* (2023.08); *B63B 2035/446* (2013.01); *F05B 2240/93* (2013.01)

(58) Field of Classification Search
CPC ... B63B 35/44; B63B 2035/446; B63B 1/107; F03D 13/256; F05B 2240/93
See application file for complete search history.

(56) References Cited

U.S. PATENT DOCUMENTS 4,538,939 A 9/1985 Johnson
6,447,208 B1 * 9/2002 Huang .................. B63B 21/502
405/195.1

(Continued)

FOREIGN PATENT DOCUMENTS

CA 3129885 A1 8/2020
CN 102852725 A 1/2013
(Continued)

OTHER PUBLICATIONS

Office Action for the Japanese Patent Application No. 2023-524929 issued by the Japanese Patent Office on Mar. 26, 2024.
(Continued)

*Primary Examiner* — Stephen P Avila
(74) *Attorney, Agent, or Firm* — IP & T GROUP LLP

(57) ABSTRACT

A floating offshore structure of the present invention comprises: a plurality of columns; and a tower support column for supporting a tower of a power generation structure, wherein a polygonal shape is formed by means of an
(Continued)

imaginary line connecting the columns, and the tower supporting column can be provided at one point of one of the sides of the polygonal shape.

7 Claims, 11 Drawing Sheets

(30) Foreign Application Priority Data

| | | |
|---|---|---|
| Jul. 20, 2021 | (KR) | 10-2021-0095139 |
| Jul. 20, 2021 | (KR) | 10-2021-0095144 |
| Oct. 19, 2021 | (KR) | 10-2021-0139754 |

(56) References Cited

U.S. PATENT DOCUMENTS

| | | | |
|---|---|---|---|
| 6,488,446 | B1 | 12/2002 | Riemers |
| 7,476,074 | B2 | 1/2009 | Jakubowski et al. |
| 8,471,396 | B2 | 6/2013 | Roddier et al. |
| 8,692,401 | B2 | 4/2014 | Roddier et al. |
| 9,120,542 | B2 | 9/2015 | Choisnet |
| 9,139,266 | B2 | 9/2015 | Roddier et al. |
| 9,352,808 | B2 | 5/2016 | Large |
| 9,394,035 | B2 | 7/2016 | Dagher et al. |
| 9,446,822 | B2 | 9/2016 | Roddier et al. |
| 9,810,204 | B2 | 11/2017 | Aubault et al. |
| 9,879,654 | B2 | 1/2018 | Peiffer et al. |
| 9,964,097 | B2 | 5/2018 | Dagher et al. |
| 10,029,760 | B2 | 7/2018 | Muehlner et al. |
| 10,174,744 | B2 | 1/2019 | Aubault et al. |
| 10,202,170 | B2 | 2/2019 | Dagher et al. |
| 10,267,293 | B2 | 4/2019 | Peiffer et al. |
| 10,293,890 | B2 | 5/2019 | Li et al. |
| 10,421,524 | B2 | 9/2019 | Cermelli et al. |
| 10,787,233 | B2 | 9/2020 | Gatesoupe et al. |
| 10,858,075 | B2 | 12/2020 | Cermelli et al. |
| 11,352,098 | B2 | 6/2022 | Dagher et al. |
| 12,410,778 | B2 | 9/2025 | Lebon et al. |
| 2004/0141812 | A1 | 7/2004 | Busso |
| 2006/0165493 | A1 | 7/2006 | Nim |
| 2010/0024705 | A1 | 2/2010 | Leverette |
| 2011/0037264 | A1 | 2/2011 | Roddier et al. |
| 2012/0103244 | A1 | 5/2012 | Gong et al. |
| 2015/0147174 | A1 | 5/2015 | Couchman et al. |
| 2016/0025064 | A1 | 1/2016 | Hashimoto |
| 2016/0075413 | A1 | 3/2016 | Nebrera Garcia et al. |
| 2016/0096599 | A1 | 4/2016 | Huang |
| 2016/0327027 | A1 | 11/2016 | Ting |
| 2016/0369780 | A1 | 12/2016 | Aubault et al. |
| 2018/0105235 | A1 | 4/2018 | Zou et al. |
| 2020/0001946 | A1 | 1/2020 | Cermelli et al. |
| 2020/0032473 | A1 | 1/2020 | Berenguer Cobián |
| 2020/0200150 | A1 | 6/2020 | Langeard |
| 2020/0269960 | A1 | 8/2020 | Boo et al. |
| 2022/0119081 | A1 | 4/2022 | Loeken et al. |
| 2022/0234698 | A1 | 7/2022 | Shi |
| 2023/0406457 | A1 | 12/2023 | Hong et al. |

FOREIGN PATENT DOCUMENTS

| | | | | |
|---|---|---|---|---|
| CN | 103708004 | A | | 4/2014 |
| CN | 102758447 | B | | 9/2014 |
| CN | 204110335 | U | * 1/2015 | ............. B63B 1/107 |
| CN | 102758446 | B | | 3/2015 |
| CN | 105026251 | A | | 11/2015 |
| CN | 104401458 | B | | 1/2017 |
| CN | 107061127 | A | | 8/2017 |
| CN | 107399411 | A | | 11/2017 |
| CN | 107539433 | A | | 1/2018 |
| CN | 107762736 | A | | 3/2018 |
| CN | 108757336 | A | | 11/2018 |
| CN | 208198767 | U | | 12/2018 |
| CN | 109263818 | A | | 1/2019 |
| CN | 208416796 | U | | 1/2019 |

| | | | |
|---|---|---|---|
| CN | 208416810 | U | 1/2019 |
| CN | 109458304 | A | 3/2019 |
| CN | 208564867 | U | 3/2019 |
| CN | 110155260 | A | 8/2019 |
| CN | 110182326 | A | 8/2019 |
| CN | 110382781 | A | 10/2019 |
| CN | 210212705 | U | 3/2020 |
| CN | 110949633 | A | 4/2020 |
| CN | 111186535 | A | 5/2020 |
| CN | 210526798 | U | 5/2020 |
| CN | 111301623 | A | 6/2020 |
| CN | 111637016 | A | 9/2020 |
| CN | 113266527 | A | 8/2021 |
| FR | 3072643 | A1 | 4/2019 |
| JP | 62-074100 | U | 5/1987 |
| JP | 2010-280301 | A | 12/2010 |
| JP | 2011-521820 | A | 7/2011 |
| JP | 2012-096601 | A | 5/2012 |
| JP | 2019104420 | A | 6/2019 |
| JP | 2020-516526 | A | 6/2020 |
| JP | 2020-101182 | A | 7/2020 |
| KR | 10-2002-0025186 | A | 4/2002 |
| KR | 10-1168113 | B1 | 7/2012 |
| KR | 10-2012-0114906 | A | 10/2012 |
| KR | 10-1433749 | B1 | 8/2014 |
| KR | 10-2015-0100012 | A | 9/2015 |
| KR | 10-2016-0007947 | A | 1/2016 |
| KR | 10-2016-0130771 | A | 11/2016 |
| KR | 10-2017-0127980 | A | 11/2017 |
| KR | 10-2018-0043210 | A | 4/2018 |
| KR | 10-2019-0027790 | A | 3/2019 |
| KR | 10-1956032 | B1 | 3/2019 |
| KR | 20190072641 | A | 6/2019 |
| KR | 10-2019-0119034 | A | 10/2019 |
| KR | 102191770 | B1 | 12/2020 |
| WO | 2012/026883 | A2 | 3/2012 |
| WO | 2013/040871 | A1 | 3/2013 |
| WO | 2014/013097 | A1 | 1/2014 |
| WO | 2020/167137 | A1 | 8/2020 |
| WO | 2022/231511 | A1 | 11/2022 |

OTHER PUBLICATIONS

Office Action issued by the Korean Patent Office for application KR 10-2021-0139754 issued on Apr. 27, 2023.

Jia Pan et al., Numerical prediction of hydrodynamic coefficients for a semi-sub platform by using large eddy simulation with volume of fluid method and Richardson extrapolation, 16th Deep Sea Offshore Wind R&D conference, Journal of Physics: Conf. Series, 1356, 012034, 2019, Japan.

Extended European Search Report for the European Patent Application No. 21886812.3 issued by the European Patent Office on Oct. 4, 2024.

Office Action for the Korean Patent Application No. 10-2024-0130078 issued by the Korean Intellectual Property Office on Oct. 23, 2024.

A Notification of Final Determination of Trial Board issued in Korean Patent No. 10-2588979 on Aug. 12, 2024.

Office Action for Chinese Patent Application No. 202180073959.6 issued by the Chinese Patent Office on Jul. 24, 2025.

Office Action for Japanese Patent Application No. 2024-168508 issued by the Japanese Patent Office on Aug. 5, 2025.

Extended European Search Report for European Patent Application No. 25190087.4 issued by the European Patent Office on Nov. 20, 2025.

Extended European Search Report for European Patent Application No. 25189506.6 issued by the European Patent Office on Nov. 24, 2025.

Extended European Search Report for European Patent Application No. 25189257.6 issued by the European Patent Office on Nov. 20, 2025.

Office Action and Search Report for Chinese Patent Application No. 202180067693.4 issued by the Chinese Patent Office on Nov. 19, 2025.

Office Action for U.S. Appl. No. 19/271,780 issued by the USPTO on Mar. 11, 2026.

(56)          References Cited

OTHER PUBLICATIONS

Office Action for U.S. Appl. No. 19/271,781 issued by the USPTO
on May 19, 2026.

* cited by examiner

FOS

110

FLOATING OFFSHORE STRUCTURE AND FLOATING OFFSHORE POWER GENERATION APPARATUS HAVING SAME

CROSS-REFERENCE TO RELATED APPLICATION

This application is a national stage entry of International Patent Application No. PCT/KR2021/015242 filed on Oct. 27, 2021, which claims priorities of Korean Patent Application No. 10-2020-0143771 filed on Oct. 30, 2020, Korean Patent Application No. 10-2021-0095134 filed on Jul. 20, 2021, Korean Patent Application No. 10-2021-0095139 filed on Jul. 20, 2021, Korean Patent Application No. 10-2021-0095144 filed on Jul. 20, 2021, and Korean Patent Application No. 10-2021-0139754 filed on Oct. 19, 2021. The disclosure of each of the foregoing applications is incorporated herein by reference in its entirety.

TECHNICAL FIELD

The present invention relates to a floating offshore structure and a floating offshore power generation apparatus having the same.

BACKGROUND ART

As problems such as the environmental regulations due to global warming and the unstable supply and demand of fossil fuels emerge, wind power generation that is one of renewable energy production systems is attracting attention.

A wind power generation apparatus is an apparatus that is installed on land or the ocean and converts wind energy into electrical energy to produce electric power.

Wind power apparatuses have been mainly installed on land, but increasingly installed on the ocean. For wind power generation, there is an advantage in that the quality of wind on the ocean is generally better than on land, and an easier response to a wing noise problem may also be possible on the ocean. In particular, in order to secure economic feasibility, the wind power generation apparatus requires to secure large-scale facility, but it is difficult to have the facility on land, and coastal or offshore ocean is emerging as a place for large-scale ocean wind facility.

A structure for installing the wind power generation apparatus on the ocean may be largely classified into a fixed type and a floating type. The fixed type structure is a type in which the structure is directly fixed to the seabed and responds to the environmental load with structural deformation as on land, and the floating type structure is a type that is floating on the water surface, receives its own weight, buoyancy, environmental load, and a mooring force, and overcomes the environmental load with the motion and mooring force of the structure.

Until recently, offshore wind power generation apparatuses are fixed types and mainly installed in shallow water. However, the fixed structure is fixed to the seabed and thus provides favorable power generation conditions but when water is deep, the scale of the structure becomes too large and it is difficult to avoid the risk of fatigue failure. In addition, there is a problem in that the cost of manufacturing and installing the structure increases astronomically according to the trend of increasing the size of the wind power generation apparatus.

In addition, since the wind becomes strong and constant as a distance from the land increases, power generation efficiency can be increased. Therefore, there is a need to develop wind power generation even in deep water away from the coast. Therefore, many studies have been conducted on ocean wind power generation apparatuses using a floating structure not limited by the size of the structure even when the water is deep.

Technical Problem

The present invention has been made in efforts to improve the related art and is directed to providing a floating offshore structure that may be installed regardless of the depth of water and a floating offshore power generation apparatus having the same.

Technical Solution

A floating offshore structure according to one aspect of the present invention includes a plurality of columns and a plurality of pontoons installed on lower ends of the columns, wherein a polygonal shape may be formed by a virtual line connecting the columns, and the pontoons may be installed inside the polygonal shape.

The columns may include a first column, a second column, and a third column, a cross section of the first column parallel to a sea level may have a hexagonal shape in which regions adjacent to two facing vertices of a rectangle are chamfered, and the chamfered region is disposed to face an outside of the polygonal shape, cross sections of the second and third columns parallel to the sea level may have rectangular shapes, and a cross-sectional area of the first column parallel to the sea level may be greater than a cross-sectional area of each of the second and third columns parallel to the sea level.

The pontoons may include a first pontoon, a second pontoon, and a third pontoon installed on lower ends of the first to third columns, respectively, and a size of the first pontoon may be greater than a size of each of the second and third pontoons.

Cross sections of the first to third pontoons parallel to the sea level may have shapes in which a region adjacent to at least one of the two facing vertices of the rectangle is chamfered, and the chamfered region may be disposed to face an inside of the polygonal shape.

The floating offshore structure may further include upper braces including a first upper brace connecting upper ends of the first column and the second column, a second upper brace connecting upper ends of the first column and the third column, a third upper brace connecting regions of the first upper brace and the second upper brace adjacent to the second column and the third column, and lower braces including a first lower brace connecting a first pontoon and a second pontoon, a second lower brace connecting the first pontoon and a third pontoon, and a third lower brace connecting lower portions of the second column and the third column.

The pontoons may be installed on inner side surfaces of the polygonal shape of the columns, each of the pontoons may have a hollow formed in a direction perpendicular to a sea level, and a porous damper may be installed in the hollow.

The porous damper may include a first porous plate, a second porous plate, and a third porous plate each having a plurality of through holes, and the through holes of the first and second porous plates do not overlap each other, and the through holes of the first and third porous plates may overlap each other in a plan view.

The porous damper may include a first porous plate, a second porous plate, and a third porous plate each having a plurality of through holes, and the through holes of the first to third porous plates may overlap each other in a plan view.

The columns may include a first column, a second column, and a third column, the pontoons may include a first pontoon, a second pontoon, and a third pontoon connecting lower ends of the first column, the second column, and the third column, and the floating offshore structure may further include a plurality of braces connecting upper ends of the first and second columns and upper ends of the first and third columns and first and second extended pontoons installed on the lower ends of the second and third columns, wherein the first to third pontoons may be disposed to correspond to lines of the polygonal shape, and the first and second extended pontoons may be installed outside the polygonal shape.

The first extended pontoon may have a shape extending parallel to the first pontoon, and the second extended pontoon may have a shape extending parallel to the second pontoon.

The floating offshore structure may further include a tower support column configured to support a tower of a power generation structure, wherein the tower support column may be provided at one point of one side of sides of the polygonal shape.

A floating offshore power generation apparatus may include the above-described floating offshore structure and the power generation structure installed on the floating offshore structure.

Advantageous Effects

The floating offshore structure and the floating offshore power generation apparatus according to the present invention can be installed without being affected by the depth of water of an installation site.

MODES OF THE INVENTION

Figure 1:
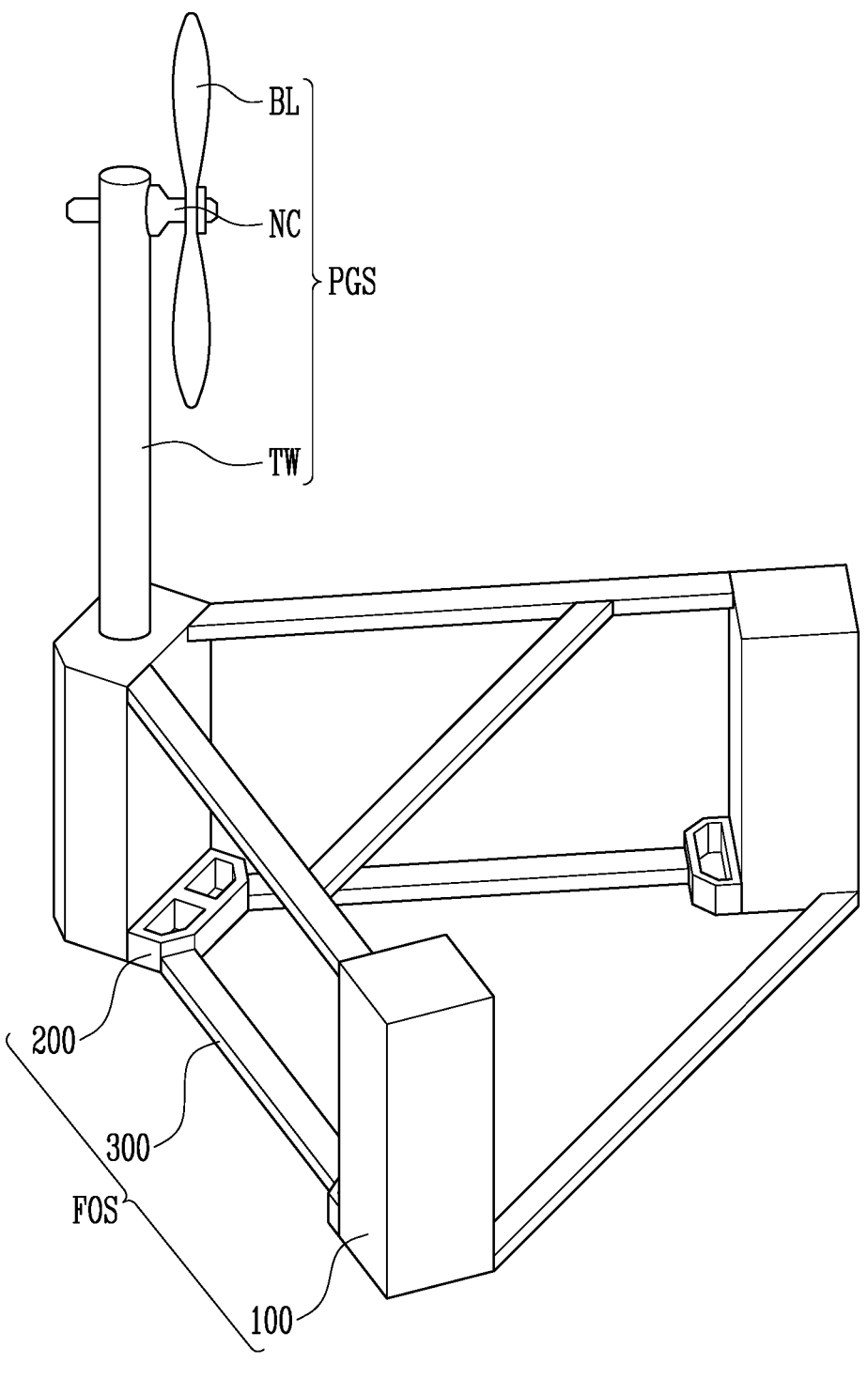
FIG. 1 is a view for describing a floating offshore power generation apparatus having a floating offshore structure according to one embodiment of the present invention.

Objects, specific advantages and new features of the present invention will become more apparent from the following detailed description and exemplary embodiments associated with the accompanying drawings. In the specification, in adding reference numerals to components of each drawing, it should be noted that the same components have the same numbers as possible even when the components are displayed on different drawings. In addition, in describing the present invention, when it is determined that a detailed description of related known technologies may unnecessarily obscure the subject matter of the present invention, the detailed description thereof will be omitted.

Hereinafter, exemplary embodiments according to the present invention will be described in detail with reference to the accompanying drawings.

FIG. 1 is a view for describing a floating offshore power generation apparatus having a floating offshore structure according to one embodiment of the present invention.

Referring to FIG. 1, a floating offshore power generation apparatus may include a floating offshore structure FOS and a power generation structure PGS.

The floating offshore structure FOS may be a structure for supporting the power generation structure PGS. The floating offshore structure FOS may include a plurality of columns 100, a plurality of pontoons 200, and a plurality of braces 300.

The plurality of columns 100 are vertical structures of the floating offshore structure FOS, the plurality of pontoons 200 may be buoyancy bodies for providing buoyancy to the floating offshore structure FOS, and the plurality of braces 300 may connect the plurality of columns 100 and the plurality of pontoons 200, thereby improving the structural stability of the floating offshore structure FOS.

The power generation structure PGS may be installed on the floating offshore structure FOS. The power generation structure PGS may include a tower TW, a nacelle NC, and a blade BL.

The tower TW may be installed on the floating offshore structure FOS. Here, the tower TW may be installed on one of the plurality of columns 100 of the floating offshore structure FOS. In other words, the power generation structure PGS may be eccentrically installed on one side of the floating offshore structure FOS.

The nacelle NC may be installed on an upper portion of the tower TW. The nacelle NC may generate electricity using a rotational force of the blade BL.

The blade BL may be rotatably installed on the nacelle NC and rotated by wind power.

Meanwhile, in one embodiment, an example in which the power generation structure PGS is eccentrically installed on the one side of the floating offshore structure FOS has been described, but the present invention may not be limited thereto. For example, the power generation structure may also be installed on the center of the floating offshore structure FOS.

Figure 2:
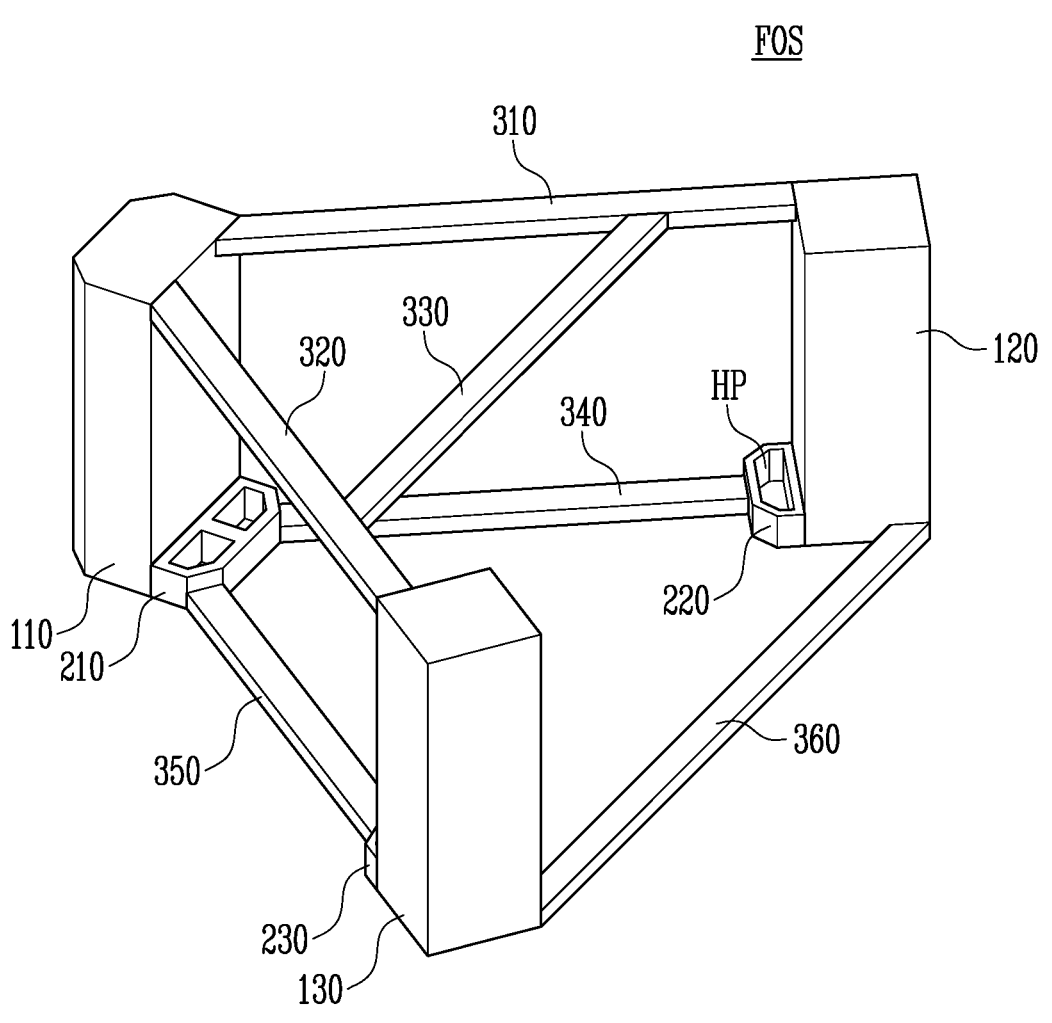
FIG. 2 is a perspective view for describing the floating offshore structure (FOS) shown in FIG. 1.
Figure 3:
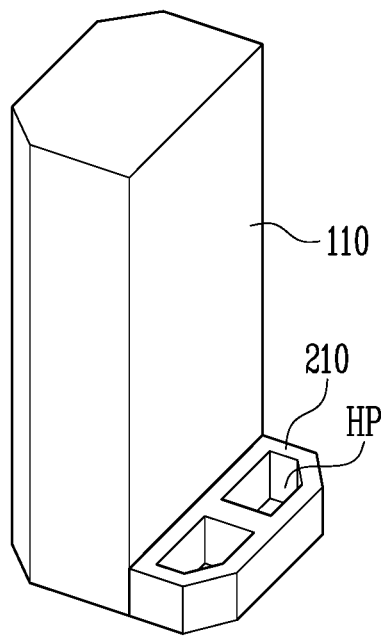
FIG. 3 is a perspective view for describing a first column and a first pontoon of FIG. 2.
Figure 4:
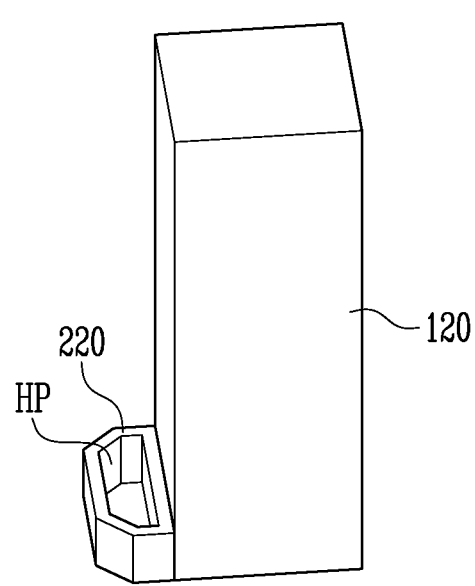
FIG. 4 is a perspective view for describing second and third columns and second and third pontoons of FIG. 2.

FIG. 2 is a perspective view for describing the floating offshore structure FOS shown in FIG. 1, FIG. 3 is a perspective view for describing a first column and a first pontoon of FIG. 2, and FIG. 4 is a perspective view for describing second and third columns and second and third pontoons of FIG. 2.

Referring to FIGS. 2 to 4, the floating offshore structure FOS may include a plurality of columns 110, 120, and 130, a plurality of pontoons 210, 220, and 230, and a plurality of braces 310, 320, 330, 340, 350, and 360.

The plurality of columns 110, 120, and 130 may support upper structures, for example, the power generation structure PGS. The floating offshore structure FOS may have a polygonal shape by a virtual line connecting the plurality of columns 110, 120, and 130. In other words, the columns 110, 120, and 130 may be disposed on vertices of polygonal shapes.

The plurality of columns 110, 120, and 130 may include the first to third columns 110, 120, and 130. Meanwhile, in the embodiment, an example in which the floating offshore structure FOS includes three columns 110, 120, and 130, but the present invention is not limited thereto. For example, the floating offshore structure FOS may also include four or more columns.

Cross sections of the first to third columns 110, 120, and 130 parallel to a sea level may have a polygonal shape, and the first to third columns 110, 120, and 130 may have the same cross section or different cross sections. For example, the cross section parallel to the sea level of the first column 110 may have a hexagonal shape in which regions adjacent to two facing vertices of a rectangle are chamfered. Here, the chamfered region of the first column 110 may be disposed toward the outside of the floating offshore structure FOS. The chamfered region of the first column 110 may be disposed to face the outside of the polygonal shape formed by the plurality of columns 110, 120, and 130.

In addition, the cross sections of the second column 120 and the third column 130 parallel to the sea level may have rectangular shapes. A cross-sectional area of the first column 110 parallel to the sea level may be greater than a cross-sectional area parallel to the sea level of each of the second column 120 and the third column 130.

Meanwhile, in the embodiment, an example in which the cross-sections of the first to third columns 110, 120, and 130 parallel to the sea level have the polygonal shape has been described, but the present invention is not limited thereto. For example, the cross sections of the first to third columns 110, 120, and 130 parallel to the sea level have straight portions in contact with the plurality of pontoons 210, 220, and 230, and the other regions may also have a curved shape. In addition, the cross sections of the first to third columns 110, 120, and 130 parallel to the sea level have shapes in which a portion of the circle is straightly cut, and the pontoons 210, 220, and 230 are installed in the cut region.

The plurality of pontoons 210, 220, and 230 may include the first to third pontoons 210, 220, and 230. The first to third pontoons 210, 220, and 230 may be installed on lower ends of the first to third columns 110, 120, and 130. Here, the first to third pontoons 210, 220, and 230 may be installed inside the polygonal shape formed by the first to third columns 110, 120, and 130.

In addition, the size of the first pontoon 210 may be greater than the sizes of the second pontoon 220 and the third pontoon 230. Therefore, the buoyancy provided by the first pontoon 210 may be greater than the buoyancy provided by each of the second pontoon 220 and the third pontoon 230.

Cross sections of the first to third pontoons 210, 220, and 230 parallel to the sea level may have a polygonal shape, and the first to third pontoons 210, 220, and 230 may have the same cross section or different cross sections. For example, the cross section of the first pontoon 210 parallel to the sea level may have a hexagonal shape in which regions adjacent to two vertices of a rectangle disposed to be spaced apart from the first column 110 are chamfered. In addition, the cross sections of the second pontoon 220 and the third pontoon 230 may have rectangular shapes in which at least one of the two vertices of the rectangle disposed to be spaced apart from the second column 120 and the third column 130 is chamfered. The chamfered regions in the cross sections of the first to third pontoons 210, 220, and 230 may have a straight or rounded curved shape.

The chamfered regions of the first to third pontoons 210, 220, and 230 may be disposed to face the inside of the polygonal shape formed by the plurality of columns 110, 120, and 130.

The first to third pontoons 210, 220, and 230 may have hollows HP. The hollow HP is formed in a direction perpendicular to the sea level and can prevent damage to the first to third columns 110, 120, and 130 caused by waves or the like.

The plurality of braces 310, 320, 330, 340, 350, and 360 may include the upper braces 310, 320, and 330 and the lower braces 340, 350, and 360.

The upper braces 310, 320, and 330 may include the first to third upper braces 310, 320, and 330. The first upper brace 310 may connect an upper end of the first column 110 and an upper end of the second column 120. The second upper brace 320 may connect an upper end of the first column 110 and an upper end of the third column 130. The third upper brace 330 may connect the first upper brace 310 and the second upper brace 320. Here, the third upper brace 330 may connect regions adjacent to the second column 120 and the third column 130 of the first upper brace 310 and the second upper brace 320.

The lower braces 340, 350, and 360 may include the first lower brace 340 connecting the first pontoon 210 and the second pontoon 220, the second lower brace 350 connecting the first pontoon 210 and the third pontoon 230, and the third lower brace 360 connecting lower portions of the second column 120 and the third column 130. The third lower brace 360 may also be connected to the first lower brace 340 and the second lower brace 350.

A length of the first lower brace 340 may be smaller than a length of the first upper brace 310. This is because the first upper brace 310 connects upper portions of the first column 110 and the second column 120, but the first lower brace 340 connects the first pontoon 210 and the second pontoon 220.

A length of the second lower brace 350 may be smaller than a length of the second upper brace 320. This is because the second upper brace 320 connects upper portions of the first column 110 and the third column 130, but the second lower brace 350 connects the first pontoon 210 and the third pontoon 230.

A length of the third lower brace 360 may be greater than a length of the third upper brace 330. This is because the third upper brace 360 connects regions of the first upper brace 310 and the second upper brace 320 adjacent to the second column 120 and the third column 130, but the third lower brace 360 connects the lower portion of the second column 120 and the lower portion of the third column 130.

Meanwhile, the tower of the power generation structure PGS may be installed on the first column 110. In other words, the power generation structure PGS may be eccentrically installed on one side of the floating offshore structure FOS. This is because the cross-sectional area of the first column 110 is the largest, thereby sufficiently securing an installation space of the power generation structure PGS. In addition, this is because the buoyancy of the first pontoon 210 installed on the first column 110 is the greatest, thereby improving the stability of the power generation structure PGS even when the power generation structure PGS is installed on the first column 110.

Meanwhile, in one embodiment, an example in which the power generation structure PGS is installed on the first column 110 of the floating offshore structure FOS has been described, but the present invention may not be limited thereto. For example, the power generation structure may also be installed on the center of the floating offshore structure FOS.

In the above-described floating offshore structure FOS, the first to third pontoons 210, 220 and 230 may be installed on inner surfaces of lower ends of the first to third columns 110, 120, and 130. Therefore, it may be advantageous for a ship coming alongside the berth to install or maintain the floating offshore structure FOS and the power generation structure PGS.

In addition, since lengths of the first lower brace 340 and the second lower brace 350 is smaller than lengths of the first upper brace 310 and the second upper brace 320, respectively, it is possible to improve the structural stability of the floating offshore structure FOS.

Figure 5:
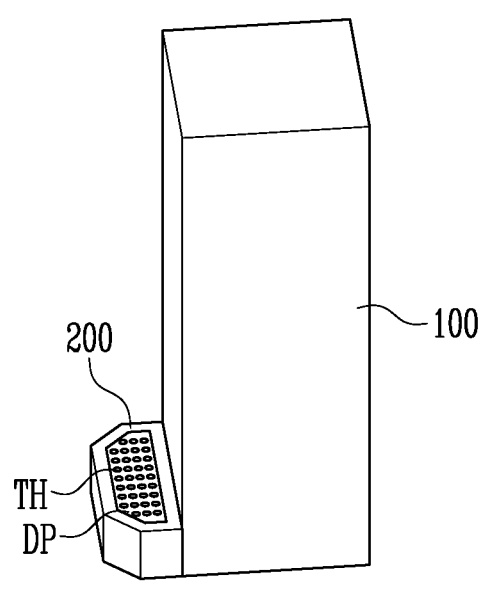
FIG. 5 is a perspective view for describing a column and a pontoon of a floating offshore structure according to another embodiment of the present invention.
Figure 6:
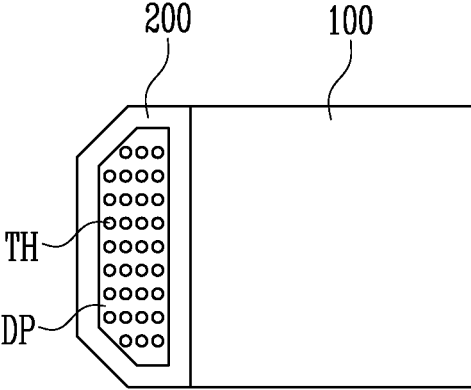
FIG. 6 is a plan view of the columns and pontoons shown in FIG. 5.
Figure 7:
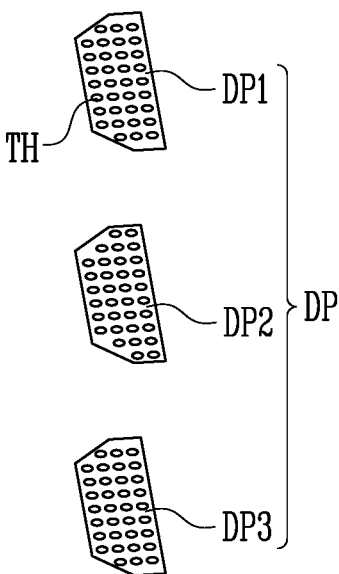
FIG. 7 is an exploded perspective view for describing a damper shown in FIG.

FIG. 5 is a perspective view for describing a column and a pontoon of a floating offshore structure according to another embodiment of the present invention, FIG. 6 is a plan view of the columns and pontoons shown in FIG. 5, and FIG. 7 is an exploded perspective view for describing a damper shown in FIG. 5.

Referring to FIGS. 5 to 7, a column 100 is a vertical structure of a floating offshore structure FOS, and a cross section of the column 100 parallel to a sea level may have a polygonal shape.

A pontoon 200 may provide buoyancy to the floating offshore structure FOS. The pontoon 200 may be installed on one side of a lower end of the column 100.

A cross section of the pontoon 200 parallel to the sea level may have a polygonal shape. For example, a cross section of the pontoon 200 parallel to the sea level may have a shape in which regions adjacent to two vertices of a rectangle disposed to be spaced apart from the column 100 are chamfered.

The pontoon 200 may include a hollow HP, and the hollow HP may be formed in a direction perpendicular to the sea level, thereby preventing damage to the column 100 caused by waves or the like. In addition, a porous damper DP may be disposed in the hollow HP. The damper DP may include at least one porous plate DP1, DP2, and DP3 having a plurality of through holes TH. For example, the damper DP may include the first to third porous plates DP1, DP2, and DP3.

The damper DP can assist dissipation of the energy of the floating offshore structure FOS. Therefore, the damper DP can reduce the vertical motion of the floating offshore structure FOS.

Meanwhile, the through holes TH of the porous plates DP1, DP2, and DP3 adjacent to each other may not overlap each other. For example, the through holes TH of the first porous plate DP1 and the second porous plate DP2 may not overlap each other. In addition, the through holes TH of the second porous plate DP2 and the third porous plate DP3 may not overlap each other in a plan view. In addition, the through holes TH of the first porous plate DP1 and the third porous plate DP3 may also overlap each other in a plan view.

In addition, the through holes TH of the porous plates DP1, DP2, and DP3 adjacent to each other may also overlap each other. For example, the through holes TH of the first to third porous plates DP1, DP2, and DP3 may overlap each other in a plan view.

Figure 8:
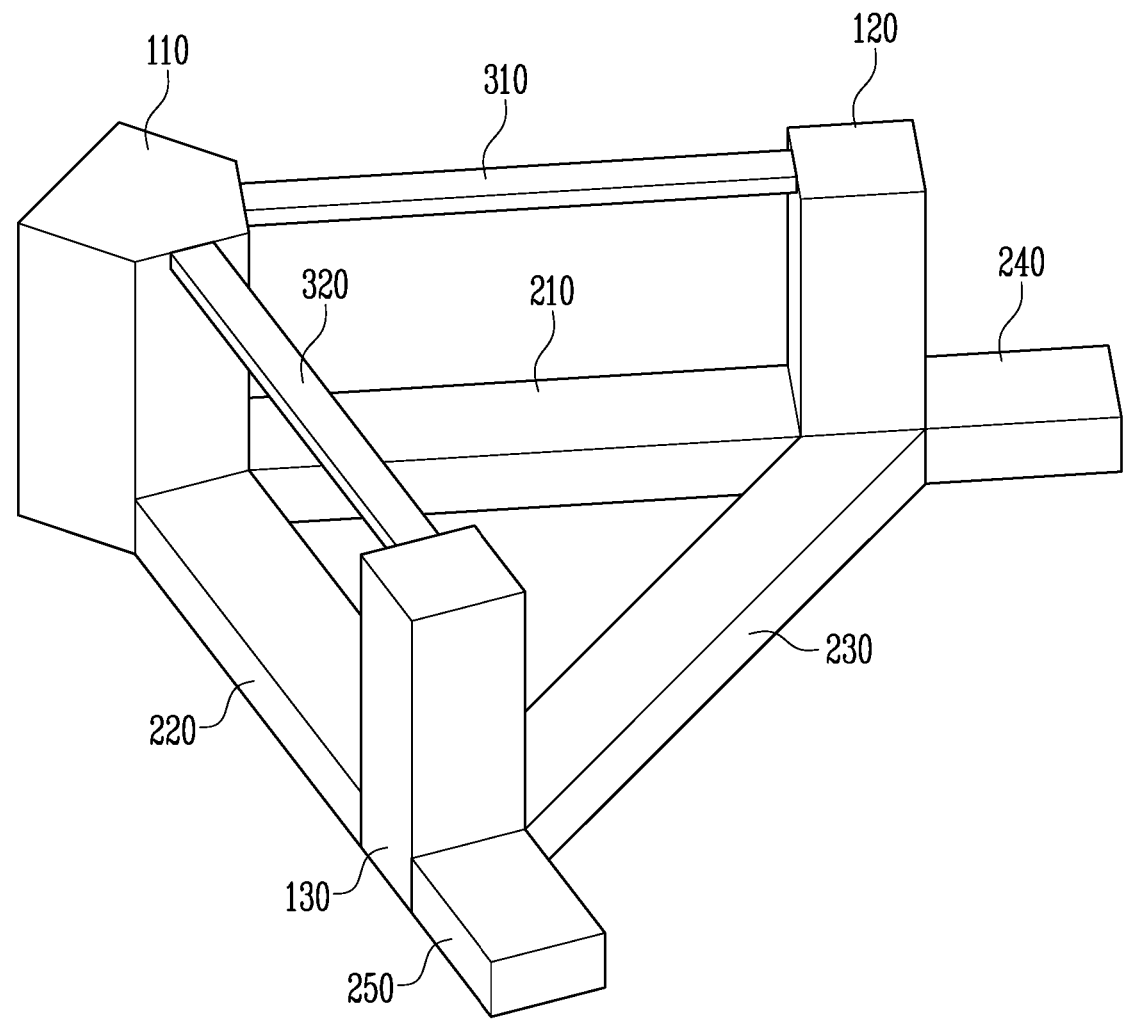
FIG. 8 is a perspective view for describing a floating offshore structure according to still another embodiment of the present invention.
Figure 9:
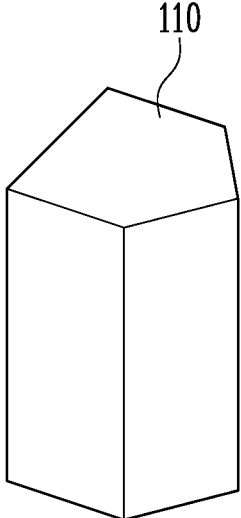
FIG. 9 is a perspective view for describing the first column shown in FIG. 8.

FIG. 8 is a perspective view for describing a floating offshore structure according to still another embodiment of the present invention, and FIG. 9 is a perspective view for describing the first column shown in FIG. 8.

Referring to FIGS. 8 and 9, a floating offshore structure FOS may include a plurality of columns 110, 120, and 130, a plurality of pontoons 210, 220, 230, 240, and 250, and a plurality of braces 310 and 320.

The plurality of columns 110, 120, and 130 may support upper structures, for example, a power generation structure PGS. The floating offshore structure FOS may have a polygonal shape by a virtual line connecting the plurality of columns 110, 120, and 130. In other words, the columns 110, 120, and 130 may be disposed on vertices of polygonal shapes.

The plurality of columns 110, 120, and 130 may include the first to third columns 110, 120, and 130.

Cross sections of the first to third columns 110, 120, and 130 parallel to the sea level may have a polygonal shape, and the first to third columns 110, 120, and 130 may have the same cross section or different cross sections. For example, a cross section of the first column 110 parallel to the sea level may have a pentagonal shape in which regions adjacent to two facing vertices of a rectangle are chamfered and the chamfered lines are connected. Cross sections of the second column 120 and the third column 130 parallel to the sea level may have rectangular shapes. Here, the chamfered portion of the first column 110 may be disposed toward the inside of the floating offshore structure FOS. In addition, a cross-sectional area of the first column 110 may be greater than a cross-sectional area of each of the second column 120 and the third column 130.

The plurality of pontoons 210, 220, 230, 240, and 250 may include the first to third pontoons 210, 220, and 230, and the first and second extended pontoons 240 and 250. The first pontoon 210 may have a shape connecting lower ends of the first column 110 and the second column 120. Here, the first pontoon 210 may be connected to one of the chamfered regions of the first column 110. The second pontoon 220 may have a shape connecting the first column 110 and the third column 130. Here, the second pontoon 220 may be connected to the other of the chamfered regions of the first column 110. The third pontoon 230 may have a shape connecting lower ends of the second column 120 and the third column 130. In other words, the first to third pontoons 210, 220, and 230 may be disposed to correspond to lines of the polygonal shape formed by the first to third columns 110, 120, and 130.

In the floating offshore structure FOS, the first extended pontoon 240 may be installed on an outer surface of the lower end of the second column 120. In the floating offshore structure FOS, the second extended pontoon 250 may be installed on an outer surface of the lower end of the third column 130. Here, the first extended pontoon 240 may have a shape extending parallel to the first pontoon 210, and the second extended pontoon 250 may have a shape extending parallel to the second pontoon 220. Therefore, the first to third pontoons 210, 220, and 230 and the first and second extended pontoons 240 and 250 may form an A shape as a whole.

The plurality of braces 310 and 320 may include the first brace 310 and the second brace 320. The first brace 310 may connect an upper end of the first column 110 and an upper end of the second column 120, and the second brace 320 may connect the upper end of the first column 110 and an upper end of the third column 130.

The floating offshore structure FOS according to the embodiment may have higher buoyancy than the floating offshore structure in which pontoons are disposed only near the first to third columns 110, 120, and 130. Therefore, it is possible to improve the floating stability of the floating offshore structure FOS.

Figure 10:
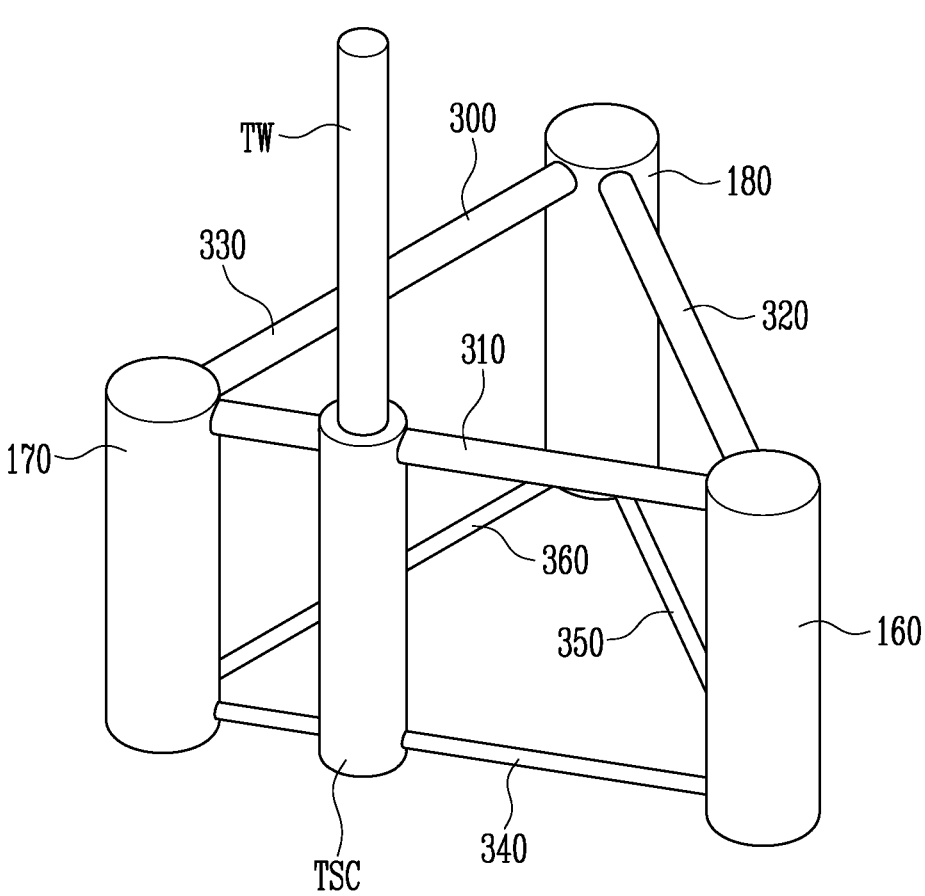
FIG. 10 is a perspective view for describing a floating offshore structure according to yet another embodiment of the present invention.
Figure 11:
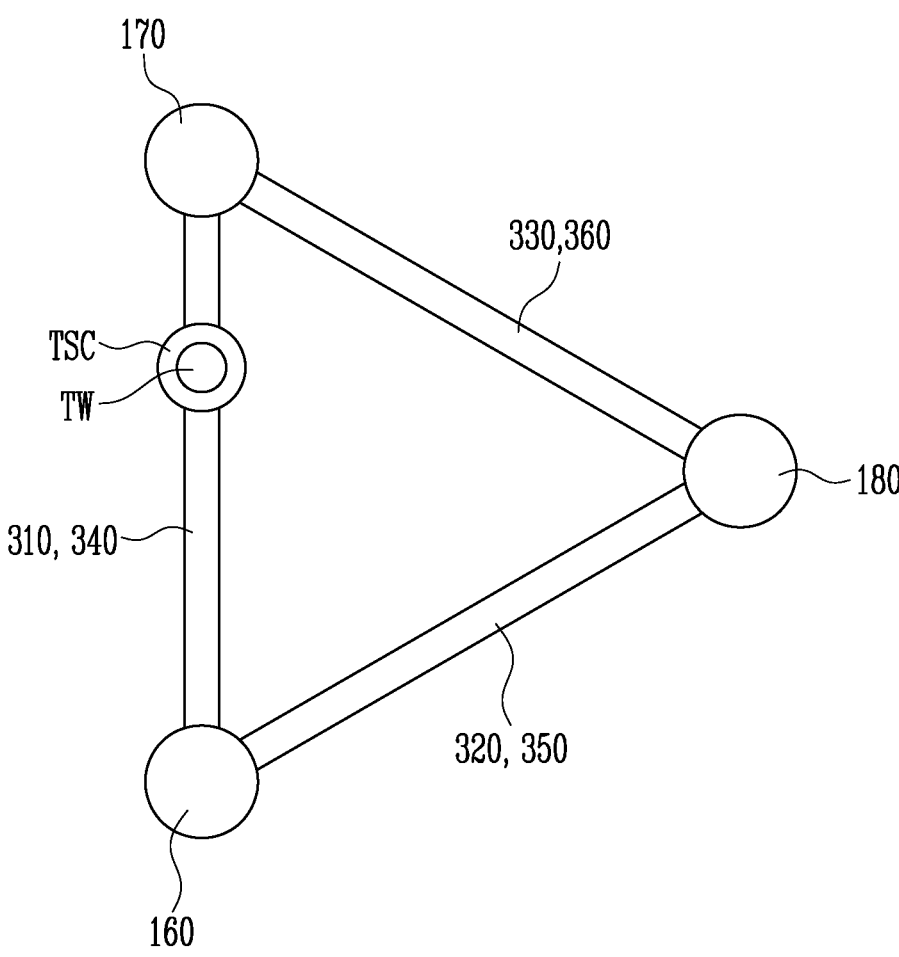
FIG. 11 is a plan view of the floating offshore structure shown in FIG. 10.

FIG. 10 is a perspective view for describing a floating offshore structure according to yet another embodiment of the present invention, and FIG. 11 is a plan view of the floating offshore structure shown in FIG. 10.

Referring to FIGS. 10 and 11, a floating offshore structure FOS may include a tower TW, a plurality of columns 160, 170, 180, and TSC, a plurality of braces 310, 320, 330, 340, 350, and 360, and a plurality of horizontal reinforcement parts.

The plurality of columns 160, 170, 180, and TSC may support upper structures, for example, a power generation structure PGS. The plurality of columns 160, 170, 180, and TSC may include the first to third columns 160, 170, and 180 and a tower support column TSC. Cross sections of the first to third columns 160, 170, and 180 and the tower support column TSC parallel to a sea level may have various shapes such as a circle or a polygon. For example, the cross sections of the first to third columns 160, 170, and 180 and the tower support column TSC parallel to the sea level may have a circular shape.

The first to third columns 160, 170, and 180 may be disposed outside the tower support column TSC. For example, the first to third columns 160, 170, and 180 may be disposed to correspond to vertices of a polygon, for example, a triangle. The tower TW, a nacelle NC, and a blade BL of the power generation structure PGS may be installed on the tower support column TSC. A height of the tower support column TSC may be greater than or equal to that of each of the first to third columns 160, 170, and 180.

The plurality of braces 310, 320, 330, 340, 350, and 360 may include the upper braces 310, 320, and 330 and the lower braces 340, 350, and 360.

The upper braces 310, 320, and 330 may connect upper ends of the first to third columns 160, 170, and 180, respectively.

The lower braces 340, 350, and 360 may connect lower ends of the first to third columns 160, 170, and 180, respectively.

The upper braces 310, 320, and 330 may include the first to third upper braces 310, 320, and 330. The first upper brace 310 may connect the upper end of the first column 160 and the upper end of the second column 170. The second upper brace 320 may connect the upper end of the first column 160 and the upper end of the third column 180. The third upper brace 330 may connect the upper end of the second column 170 and the upper end of the third column 180.

The lower braces 340, 350, and 360 may include the first to third lower braces 340, 350, and 360. The first lower brace 340 may connect the lower end of the first column 160 and the lower end of the second column 170. The second lower brace 350 may connect the lower end of the first column 160 and the lower end of the third column 180. The third lower brace 360 may connect the lower end of the second column 170 and the lower end of the third column 180.

Meanwhile, the tower support column TSC may be provided at one point among sides of the polygon formed by the first to third columns 160, 170, and 180. For example, the tower support column TSC may be provided at a point not including the center and end of any one of the sides of the polygon formed by the first to third columns 160, 170, and 180. In other words, the tower support column TSC may be provided at a position excluding the center and both ends of any one of the sides of the polygon formed by the first to third columns 160, 170, and 180.

Inner sides of the first to third columns 160, 170, and 180 and the tower support column TSC may be filled with ballast water. Here, since the tower support column TSC is provided at a position other than the center of the polygon formed by the first to third columns 160, 170, and 180, the amounts of the ballast water filled in the first to third columns 160, 170, and 180 and the tower support column TSC may be different from each other for co-directional wave, current, and wind (COD) control. For example, the amount of the filled ballast water may be smaller toward the tower support column TSC. In other words, the amount of the ballast water filled in the column adjacent to the tower support column TSC among the first to third columns 160, 170, and 180 may be smaller than the amounts of the ballast water filled in the other columns.

In addition to the above-described embodiments, the present invention may encompass all embodiments generated by a combination of two or more of the embodiments or a combination of one or more embodiments and the known technology.

Although the present invention has been described above in detail through specific embodiments, this is to specifically describe the present invention, the present invention is not limited thereto, and it will be apparent that modifications or improvements thereof are possible by those skilled in the art without departing from the technical spirit of the present invention.

All simple modifications or changes of the present invention fall within the scope of the present invention, and the specific scope of the present invention will be clarified by the appended claims.

The invention claimed is:

1. A floating offshore structure comprising:
a plurality of columns; and
a plurality of pontoons installed on lower ends of the columns,
wherein a polygonal shape is formed by a virtual line connecting the columns,
the pontoons are installed inside the polygonal shape,
the columns include a first column, a second column, and a third column, and
a cross-sectional area of the first column parallel to a sea level is greater than a cross-sectional area of each of the second and third columns parallel to the sea level,
wherein the pontoons are installed on inner side surfaces of the polygonal shape of the columns,
each of the pontoons has a hollow formed in a direction perpendicular to the sea level, and
a porous damper is installed in the hollow, and
wherein the porous damper includes a first porous plate, a second porous plate, and a third porous plate each having a plurality of through holes, and
the through holes of the first to third porous plates overlap each other in a plan view.

2. The floating offshore structure of claim 1, wherein a cross section of the first column parallel to a sea level has a hexagonal shape in which regions adjacent to two facing vertices of a rectangle are chamfered, and the chamfered region is disposed to face an outside of the polygonal shape, and
cross sections of the second and third columns parallel to the sea level have rectangular shapes.

3. The floating offshore structure of claim 1, further comprising a tower support column configured to support a tower of a power generation structure,
wherein the tower support column is provided at one point of one side of sides of the polygonal shape.

4. A floating offshore power generation apparatus comprising:
the floating offshore structure of claim 1; and a power generation structure installed on the floating offshore structure.

5. A floating offshore structure comprising:

a plurality of columns; and a plurality of pontoons installed on lower ends of the columns, wherein a polygonal shape is formed by a virtual line connecting the columns, the pontoons are installed inside the polygonal shape, the columns include a first column, a second column, and a third column, and a cross-sectional area of the first column parallel to a sea level is greater than a cross-sectional area of each of the second and third columns parallel to the sea level, wherein the pontoons are installed on inner side surfaces of the polygonal shape of the columns, each of the pontoons has a hollow formed in a direction perpendicular to the sea level, and a porous damper is installed in the hollow, and wherein the porous damper includes a first porous plate, a second porous plate, and a third porous plate each having a plurality of through holes, and the through holes of the first and second porous plates do not overlap each other, and the through holes of the first and third porous plates overlap each other in a plan view.

6. The floating offshore structure of claim 5, further comprising a tower support column configured to support a tower of a power generation structure, wherein the tower support column is provided at one point of one side of sides of the polygonal shape.

7. A floating offshore power generation apparatus comprising:

the floating offshore structure of claim 5; and a power generation structure installed on the floating offshore structure.

* * * * *